United States Patent
Hardacker

(10) Patent No.: US 8,421,851 B2
(45) Date of Patent: Apr. 16, 2013

(54) VISION CORRECTION FOR HIGH FRAME RATE TVS WITH SHUTTER GLASSES

(75) Inventor: Robert L. Hardacker, Escondido, CA (US)

(73) Assignee: Sony Corporation, Tokyo (JP)

( * ) Notice: Subject to any disclaimer, the term of this patent is extended or adjusted under 35 U.S.C. 154(b) by 446 days.

(21) Appl. No.: 12/655,616

(22) Filed: Jan. 4, 2010

(65) Prior Publication Data

US 2011/0164122 A1 Jul. 7, 2011

(51) Int. Cl.
*H04N 13/04* (2006.01)

(52) U.S. Cl.
USPC .................................. 348/53; 348/56

(58) Field of Classification Search .................. None
See application file for complete search history.

(56) References Cited

U.S. PATENT DOCUMENTS

| | | | |
|---|---|---|---|
| 5,877,841 A | 3/1999 | Jeon | |
| 6,456,432 B1 | 9/2002 | Lazzaro et al. | |
| 7,350,921 B2 | 4/2008 | Ridings | |
| 7,643,025 B2 * | 1/2010 | Lange | 345/419 |
| 2001/0043266 A1 * | 11/2001 | Robinson et al. | 348/53 |
| 2005/0046617 A1 | 3/2005 | Kurtzer et al. | |
| 2005/0108661 A1 | 5/2005 | Deeds | |
| 2009/0185030 A1 * | 7/2009 | McDowall et al. | 348/53 |
| 2009/0303311 A1 * | 12/2009 | Stoen et al. | 348/14.08 |
| 2012/0057007 A1 | 3/2012 | Ishiguro | |

FOREIGN PATENT DOCUMENTS

WO  WO 01/25836 A2  4/2001
WO  WO 2011/156721  12/2011

OTHER PUBLICATIONS

Anonymous, "New Vision Test, Enfant, Uses TV to Test Kids' Eye Sight," NBCNC, published Aug. 26, 2009.
Ro, Yong Man et al., "Color Adaptation for Anomalous Trichromats," Multimedia Group, Information and Communication University, Feb. 3, 2004.
Kim, Jeonghoon et al., "MPEG-Based Image Enhancement for the Visually Impaired," Optical Engineering, vol. 43 No. 6, pp. 1318-1328, Jun. 2004.
"Double Vision TV," Ayite et al.; University of Pennsylvania Department of Electrical and Systems Engineering; pp. 5-6, 13; Apr. 21, 2005.

* cited by examiner

*Primary Examiner* — Sath V Perungavoor
*Assistant Examiner* — Kate Luo
(74) *Attorney, Agent, or Firm* — Miller Patent Services; Jerry A. Miller

(57) ABSTRACT

A television consistent with certain implementations has a display system having a display frame refresh rate R. A frame synchronizer transmitter transmits a signal used to synchronize frame refreshes for a left and right eye images of shutter glasses, where a sequence of left and right eye images to the shutter glasses defines one image cycle. A video processor that alters at least one image per image cycle so that at least one of the images to at least one eye of at least one of the shutter glasses is synchronized to a display frame that has been altered by the video processor. This abstract is not to be considered limiting, since other embodiments may deviate from the features described in this abstract.

30 Claims, 8 Drawing Sheets

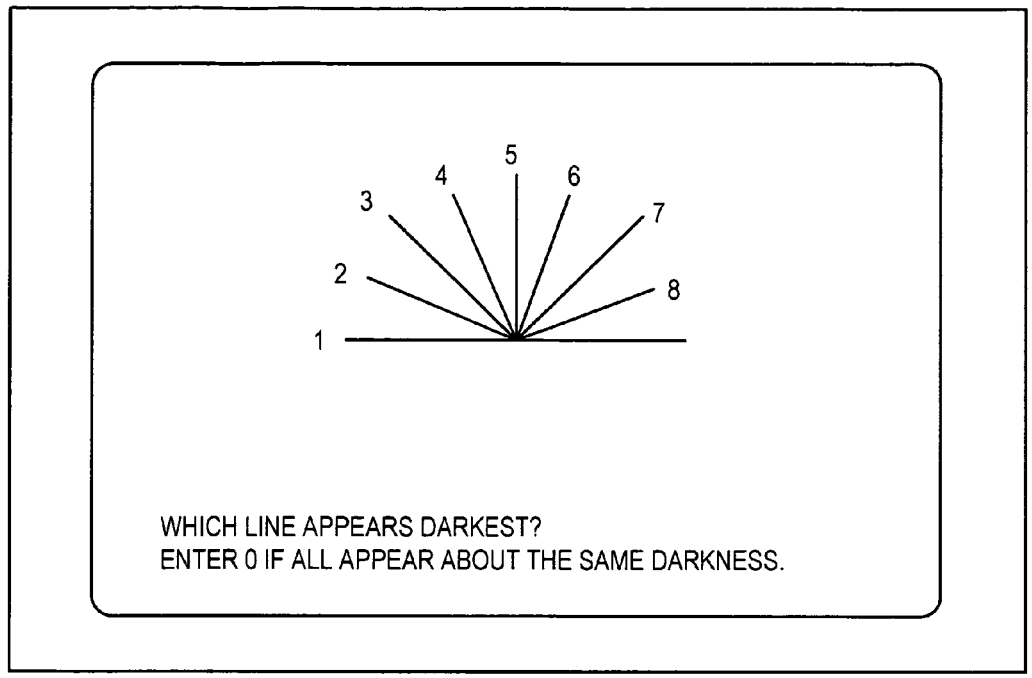
FIG. 7
FIG. 8
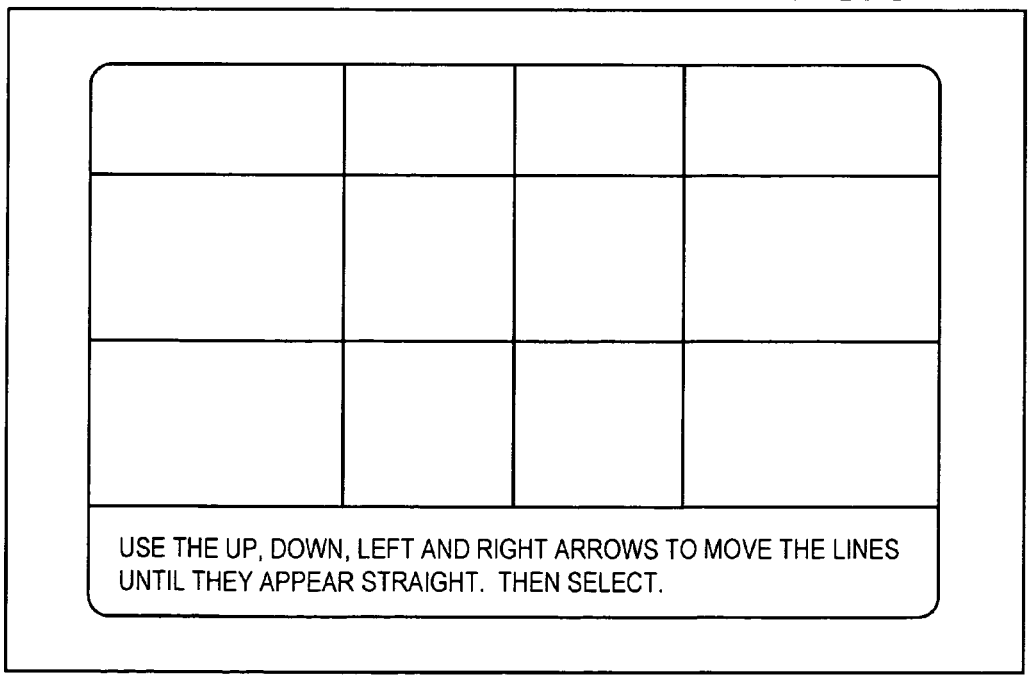

FIG. 11
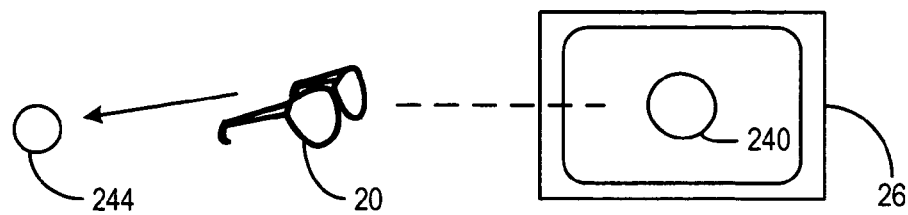
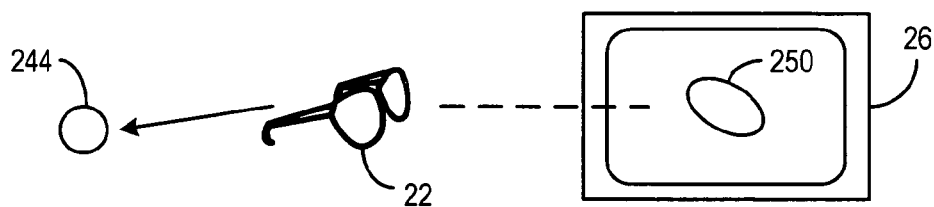
FIG. 12
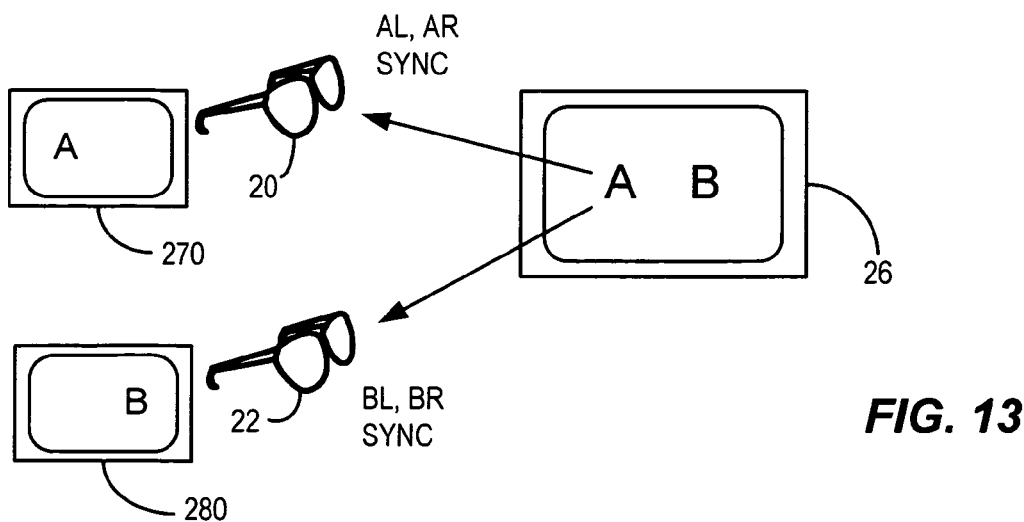
FIG. 13

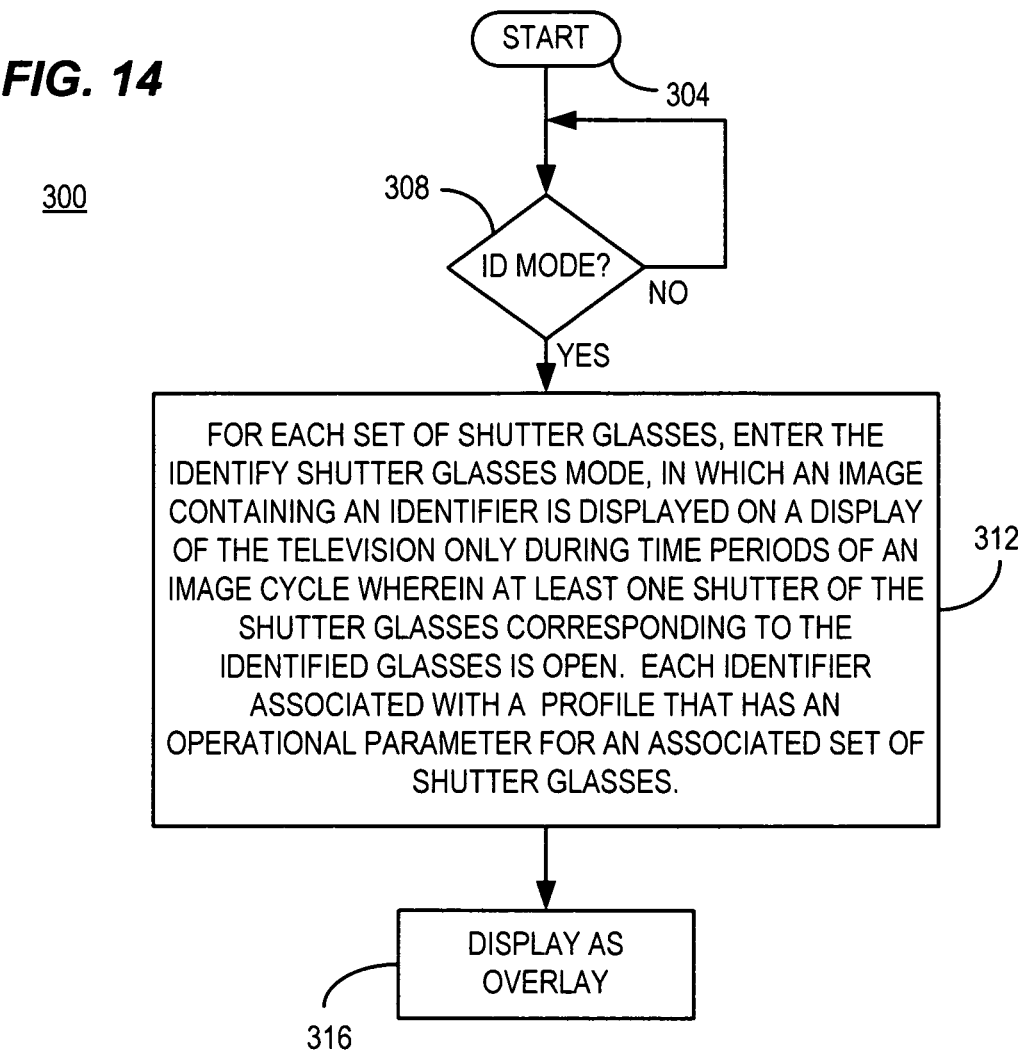

US 8,421,851 B2

VISION CORRECTION FOR HIGH FRAME RATE TVS WITH SHUTTER GLASSES

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Three dimensional televisions sets have been developed which utilize stereoscopic techniques for display of simulated three dimensional effects. In some such devices, shutter glasses (e.g., LCD shutter glasses) are used which can synchronize the displayed frames as right and left eye pictures to simulate the three dimensional (3D) effect by displaying slightly differently located images to each eye.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 7 is an example of a vision chart used in a manner consistent with certain embodiments of the present invention.

FIG. 8 is another example of a vision chart used in a manner consistent with certain embodiments of the present invention.

FIG. 11 is an example of uncorrected vision for a viewer consistent with certain embodiments of the present invention.

FIG. 12 is an example of corrected vision for a viewer consistent with certain embodiments of the present invention.

FIG. 13 depicts an example display used to determine which set of glasses is synchronized to a particular profile in accord with certain embodiments of the present invention.

FIG. 14 depicts an example of a process for identification of shutter glasses in a manner consistent with certain embodiments of the present invention.

DETAILED DESCRIPTION

Figure 1:
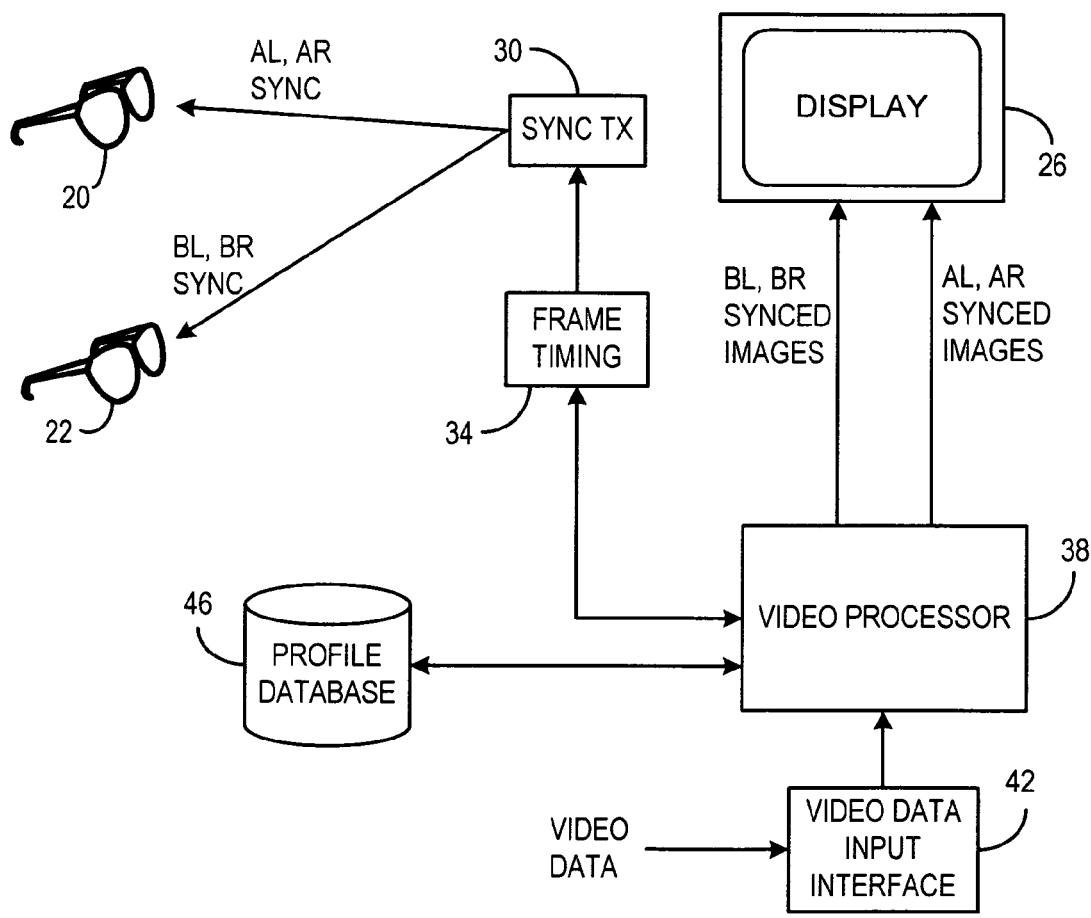
FIG. 1 is an example of a television system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Certain implementations consistent with the present invention supports multiple viewers with vision abnormalities or aberrations corrected by the display and personalized by synchronizing with the shutter glasses for a television viewing experience for people who need vision correction for normal TV viewing.

Current 3D viewing technology employs colored or polarized lenses or shutter glasses to provide a slightly different view perspective to each eye creating a 3D effect. People who must wear eyeglasses are at a significant disadvantage as they cannot easily employ traditional viewing glasses to enjoy this technology. In accord with certain embodiments consistent with this invention the synchronizing requirement between the TV and shutter style glasses can be used in combination with high frame rate TVs (>approximately 100 Hz, typically 120 or 240 or 480 or faster in the U.S.) and signal processing within the TV to make corrections to the image to improve their viewing experience.

It is noted that as a point of information, that TV standards in the U.S. were based upon a frame rate of 29.97 Hz for analog interlaced video so that two consecutive frames together created a complete picture at a rate of 59.94 Hz. The U.S. standards were based upon a chroma sub-carrier operating at 3.58 MHz as defined in the NTSC specifications. Digital TVs in the U.S. commonly use multiples of 30 Hz (60, 120, 240, 480, etc) for the refresh rate of the display panel. Hence, as used herein, a reference to 30 Hz or a multiple thereof is intended to be approximate. Computer monitors use a variety of non-standard refresh rates which are not necessarily integer multiples of either approximately 25 or 30 Hz, but embodiments consistent with the present invention can be used with such non-standard refresh rates too. In Europe, the standard refresh rates were standardized at approximately 25 Hz or integer multiples thereof as the basis for PAL and SECAM standards. Accordingly, implementations consistent with the present invention can be executed using multiples of 25 Hz or 30 Hz.

The high television image refresh rate combined with synchronization between the TV and the shutter glasses allows for separate content to be synchronized to for each viewer. In this case it can be the same content however the signal processing of the TV can be used to compensate for vision deficiencies of one or more viewers.

For example, consider two people viewing a 3D show, person A is astigmatic in the left (L) eye and the R eye is normal. Person B has normal vision. Normally a 240 Hz TV might simply display an L eye image at 120 Hz and a R eye image at 120 Hz and the sync of the shutter glasses would ensure the L eye sees the L image and the R eye sees the R image and both people would see the same images in their L and R eyes respectively. In a system consistent with certain implementations of the present invention, there would be four different images shown and synchronized synced with shutter glasses i.e. A-L, B-L, A-R, B-R. Here each person would see a customized image replete with signal processing to correct the vision anomaly allowing each viewer to see the TV image more or less normally while only wearing the shutter glasses. Person A would see an image enhanced and corrected using signal processing for their L eye and a normal image in their R eye such that the TV would compensate as glasses would normally. The images would be presented to each eye at 60 Hz rather than 120 Hz. Note that in this example, A-R and B-R are potentially the same image.

While it may not be possible to fully correct all vision abnormalities, the viewing experience can be improved for many viewers using techniques consistent with the present discussion.

Turning now to FIG. 1, the basic elements of a television system consistent with certain implementations of the present invention are depicted. While shutter glasses are commonly only used for 3D TV, there is no reason that a 2D image cannot be displayed using the present techniques. In this example, two sets of shutter glasses are depicted as 20 and 22 to represent glasses A and B respectively. However, if the system refreshes frames fast enough, any number of sets of shutter glasses could be used.

To render an acceptable image quality, the display system should have a display frame refresh rate R greater than or equal to about 100 Hz for the display 26, with higher refresh rates being used normally to render greater numbers of intermediate frames that are generated within the television system to produce smoother flow of motion. A plurality of shutter glasses can be used to view the display, where the shutter glasses are synchronized with frame refreshes to produce a left and right eye image for each of the plurality of shutter glasses. For purposes of this document, a sequence of left and right eye images to each of the plurality of shutter glasses will be considered to define one image cycle. The images are synchronized with the shutter glasses by either a hardwired or RF or infrared synchronization signal from a sync transmitter 30. The sync transmitter 30 is synchronized to the frame timing information at 34 that is used to display the sequence of frames on display 26.

A video processor 38 alters at least one image per image cycle so that at least one of the images to at least one eye of at least one of the shutter glasses 20 and 22 is synchronized to a display frame that has been altered by the video processor 38. The various sequential frames are derived from video data presented to a video data interface 42 which supplies decoded data to the video processor 38. The information used by the video processor can be a part of a user profile stored in a profile database 46 that associates a user of a set of the shutter glasses (and in turn the set of glasses) with a particular profile that defines what alteration or algorithm to apply to the image presented to that set of glasses.

Figure 2:
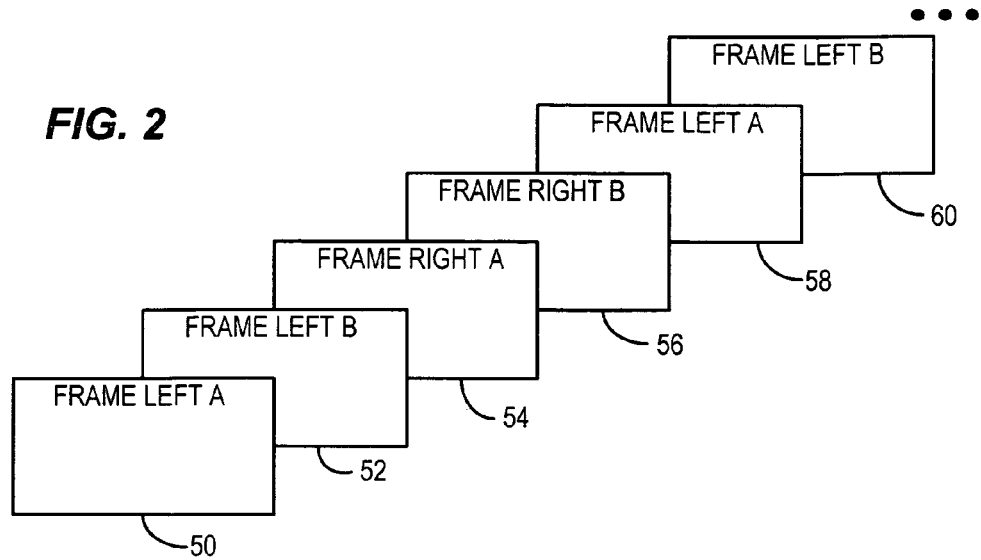
FIG. 2 is an example sequence of frames consistent with certain embodiments of the present invention.

A sequence of frames may be presented to the shutter glasses in the manner depicted in FIG. 2 which depicts the full sequence of displayed frames assuming a refresh cycle R that is great enough to accommodate only the two viewers A and B. As depicted, the cycle starts with left eyes first for viewer A and then for viewer B at 50 and 52. This is followed by rendering right eye images first for viewer A and then for viewer B at 54 and 56 respectively. This constitutes one refresh cycle R, and the process begins again with two new left eye images 58 and 60 for viewers A and B respectively, etc.

Figure 3:
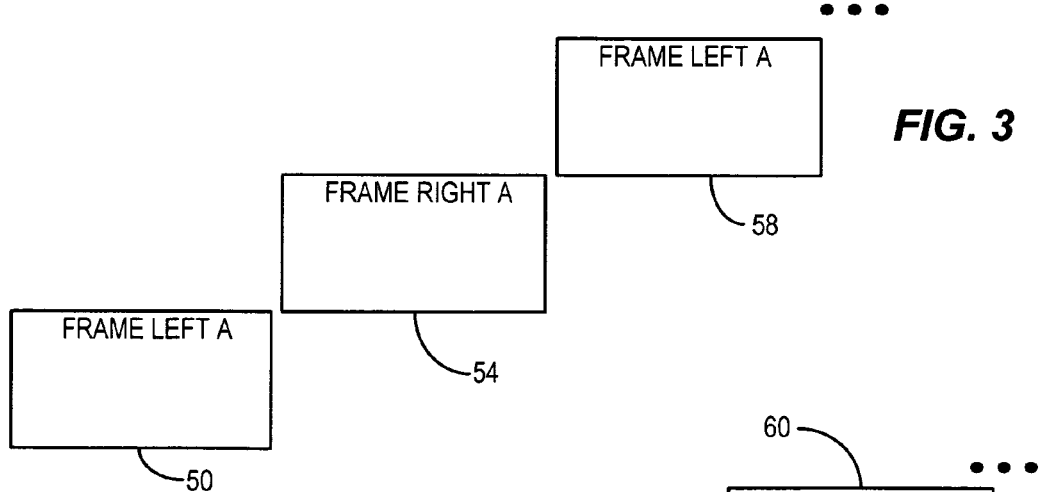
FIG. 3 is an example sequence of frames as delivered to viewer A in a manner consistent with certain embodiments of the present invention.
Figure 4:
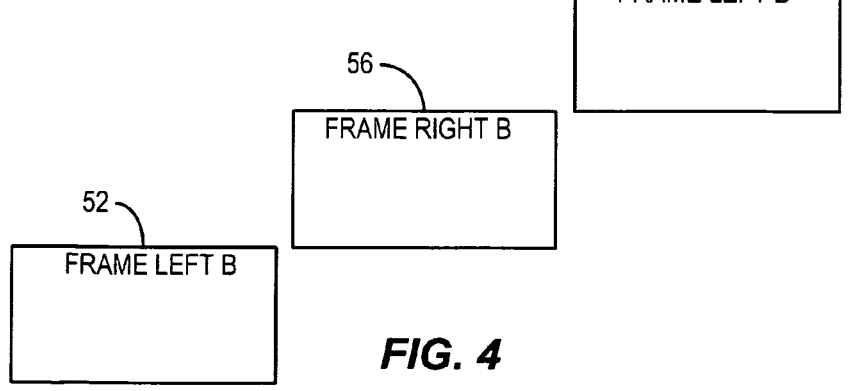
FIG. 4 is an example sequence of frames as delivered to viewer B in a manner consistent with certain embodiments of the present invention.

The shutter glasses 20 are synchronized such that the viewer A receives the sequence of left eye and right eye images 50, 54, 58, etc. as shown in FIG. 3. Similarly, the shutter glasses 22 are synchronized such that the viewer B receives the sequence of left and right eye images 52, 56 and 60 as shown in FIG. 4. Viewer A's images are blocked from view by shutter glasses 22 and viewer B's images are blocked from view by shutter glasses A. The concept can clearly be applied to more than two sets of glasses. At least one of the images should be altered in a manner than enhances the ability of a person to see the image despite a vision abnormality, in accord with certain implementations.

The video processor 38 can be employed to carry out any number of alterations of an image to correct for vision imperfections or vision therapy purposes. For example:

The images viewed by a viewer with "lazy eye" (amblyopia) can be altered so that one eye is blocked from seeing the image entirely in a manner similar to that commonly employed by use of an eye patch. In this case, for 3D images, a 2D image may be rendered or either left or right eye image used as the sole image viewed.

The images viewed by a viewer who is nearsighted or farsighted may be enhanced by a suitable image processing algorithm or simply by zooming the image in more than the image that would normally be displayed.

The images viewed by a viewer with macular degeneration can be enhanced to create an image that appears brighter in the center than at the edges to compensate for the lower vision level in the center of an image.

The images viewed by a viewer with glaucoma can be can be enhanced to create an image that appears brighter at the edges than in the center to compensate for the lower levels of peripheral vision.

The images viewed by a viewer with astigmatism can be altered to have the image skewed or image lines curved to correct for the improper bending of light.

The images viewed by a viewer with double vision can be altered to cancel the doubled image.

Other techniques for correction or enhancement of images will occur to those skilled in the art upon consideration of the present teachings.

In order to perform the desired processing, the system should obtain information about the condition of the eyes of the person that is to use a particular pair of shutter glasses. As previously noted, the present techniques may be useful to enhance the viewing experience, but may not fully correct a particular person's vision. However, in any case, viewer input is utilized to determine what kind(s) and degree(s) of correction should be implemented.

Figure 5:
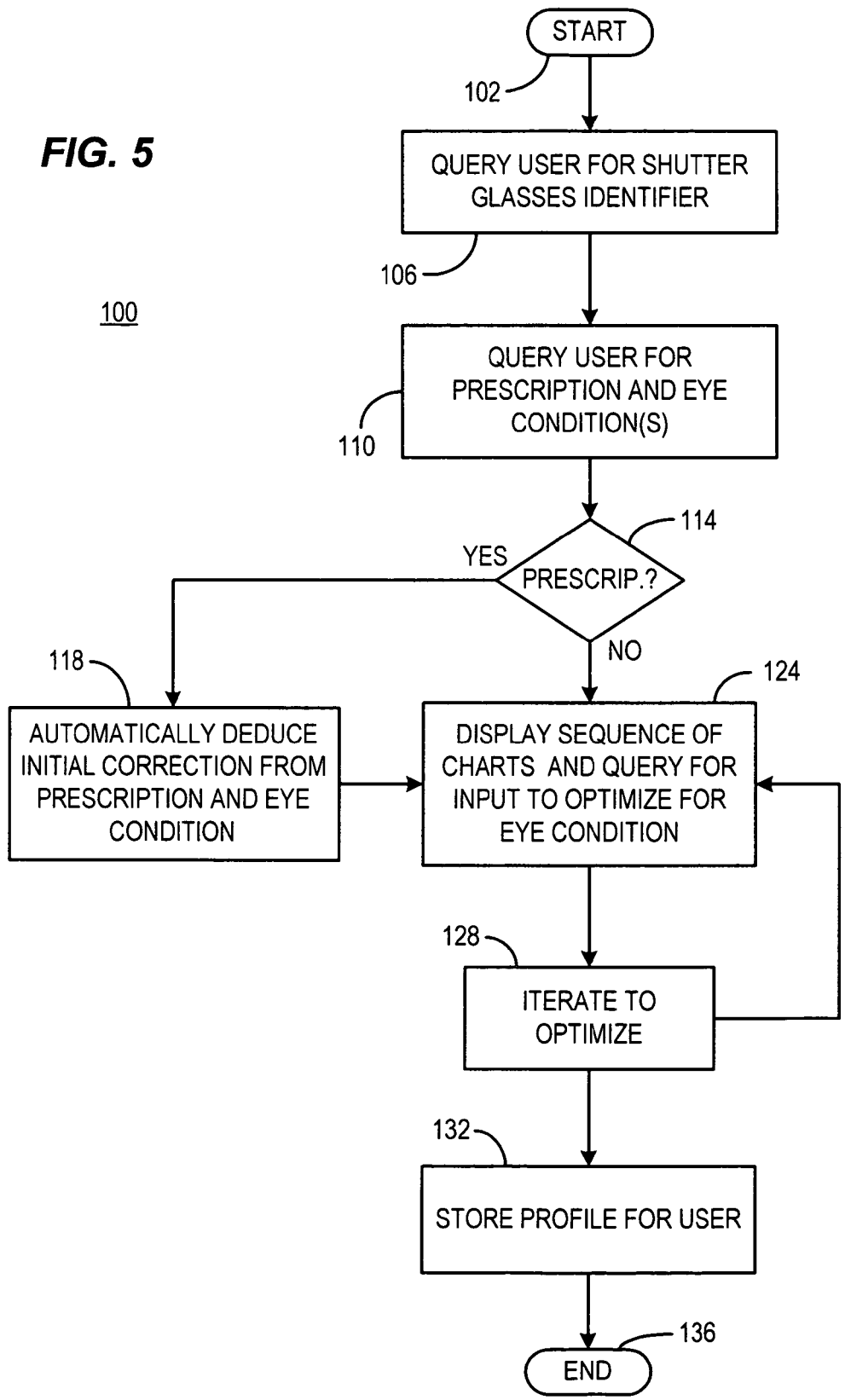
FIG. 5 is an example of a flow chart of a process for determining a user profile for vision correction in a manner consistent with certain embodiments of the present invention.

In FIG. 5, one example of a process 100 that can be used in a manner consistent with certain embodiments of the present invention is depicted starting at 102. In this implementation, the user may be queried at 106 in some manner to identify the set of shutter glasses to be associated with the user or used during a setup process to manipulate the kind and degree of correction to be implemented. Once the user is associated with a set of shutter glasses, the user can be queried for a prescription and or an eye condition that is to be treated at 110, and to which eyes the condition pertains. If the user has a prescription at 114, this can be used as a starting point to deduce what type of correction might be appropriate. For example, if the user is nearsighted, the processor may wish to suggest a bit of zooming of the presented image to make it easier for the viewer, but the viewer may wish to reject this. Additionally, the closed caption information may be altered to permit easier reading. In certain instances, afflictions such as nearsightedness may be compensated by enhancement of contrast and/or sharpness, and/or zooming and/or by application of other algorithms (such as those used in a diagnostic instrument) to help compensate for image blurring. Other afflictions may be similarly dealt with as described above.

When a prescription is available at 118, a starting point correction may be deduced automatically and either used without further refinement, or as shown may be used to arrive at an initial set of corrections to be applied to the image. The process can then proceed to 124 where a sequence of charts and/or queries can be presented to refine to degree of correction to the user's liking. The user can then supply input that is used in an iterative process at 128 to adjust the algorithm and corrections applied to the displayed image until the user is satisfied that the images is optimized to the degree possible at 128. At this point, the profile can be stored at 132 and subsequently retrieved as needed to supply the correction to the image presented to that user. The setup process ends at 136.

Figure 6:
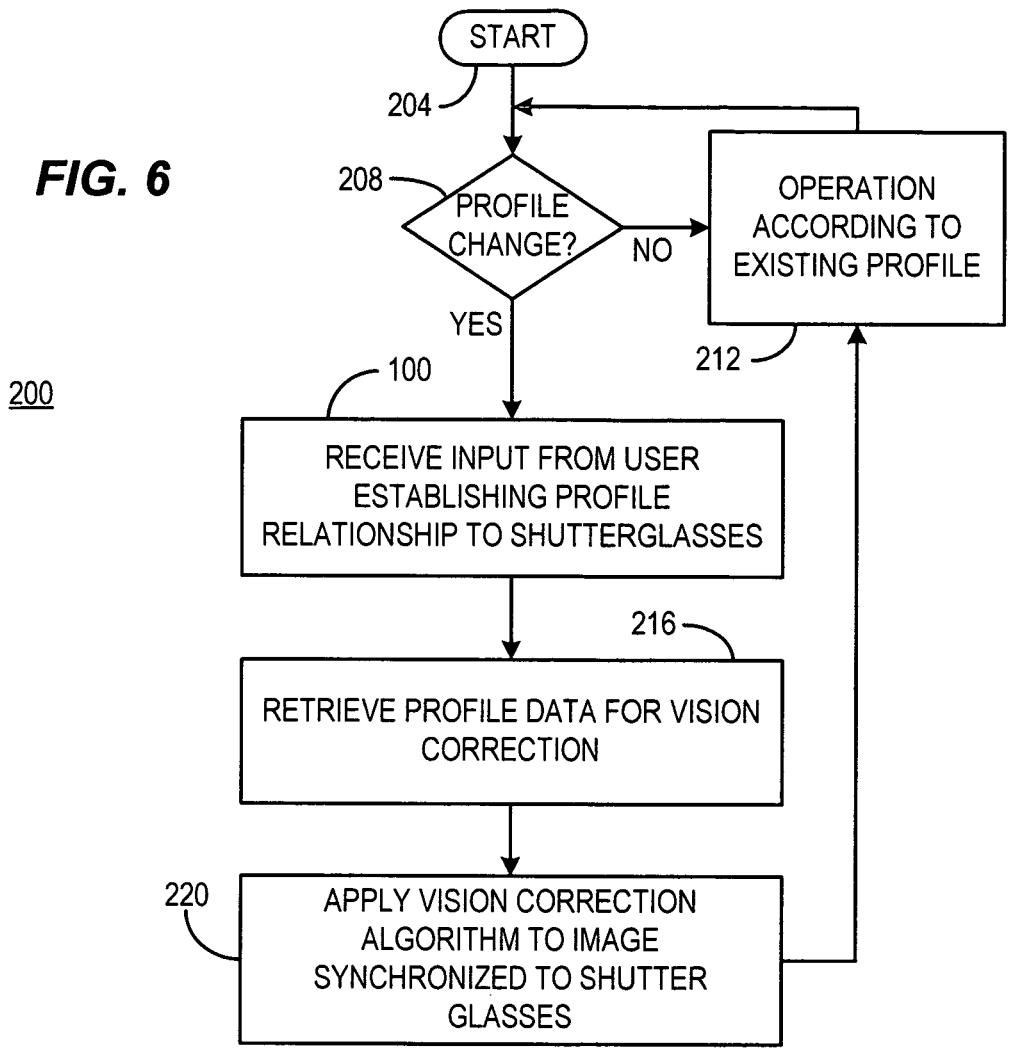
FIG. 6 is an example of a flow chart of a process for implementing a profile of a user in a manner consistent with certain embodiments of the present invention.

In FIG. 6, an example process 200 for implementing the vision correction for a given viewer is depicted starting at 204 after which a determination is made at 208 as to whether or not a profile for a given set of shutter glasses is to be changed. If not, the currently stored and enabled set of profile parameters is used at 212 and the process awaits a profile change at 208. If a command is issued to change a profile for a particular set of shutter glasses, the process described at 100 (or similar process) is implemented so as to receive input for the user to establish a profile relationship to the shutter glasses. At 216, the profile data for a particular viewer's vision correction is retrieved and applied at 220 to the vision correction algorithm for the image synchronized to the identified shutter glasses. Operation according to the new profile then proceeds at 212.

At 124 of FIG. 5, any number of queries can be used to determine how to enhance the viewing experience of the viewer can be implemented. In one example, the viewer can be first posed with a series of questions, the answers to which can be used to minimize the number of process elements that are to be carried out subsequently (e.g., questions about the type of eye affliction and/or entry of a prescription). Subsequently or alternatively, the viewer can be taken through a sequence of tests to determine how to best correct for the vision impairment. For example, FIG. 7 depicts a typical astigmatism test that can be used to identify an angle of astigmatism. In this test, the user can be asked to pick a line that appears darker than the others and the response can be carried out via a remote controller entry. Similarly, FIG. 8 depicts a chart that the user can interact with so as to move lines using remote controller arrow keys until the horizontal and vertical lines appear straight and parallel, with the horizontal and vertical being perpendicular. Once such parameters are known, they can be used to pre-warp the image displayed so as to counteract a visual impairment which causes an imperfection in perception of straight lines as curves or astigmatic anomalies.

Figure 9:
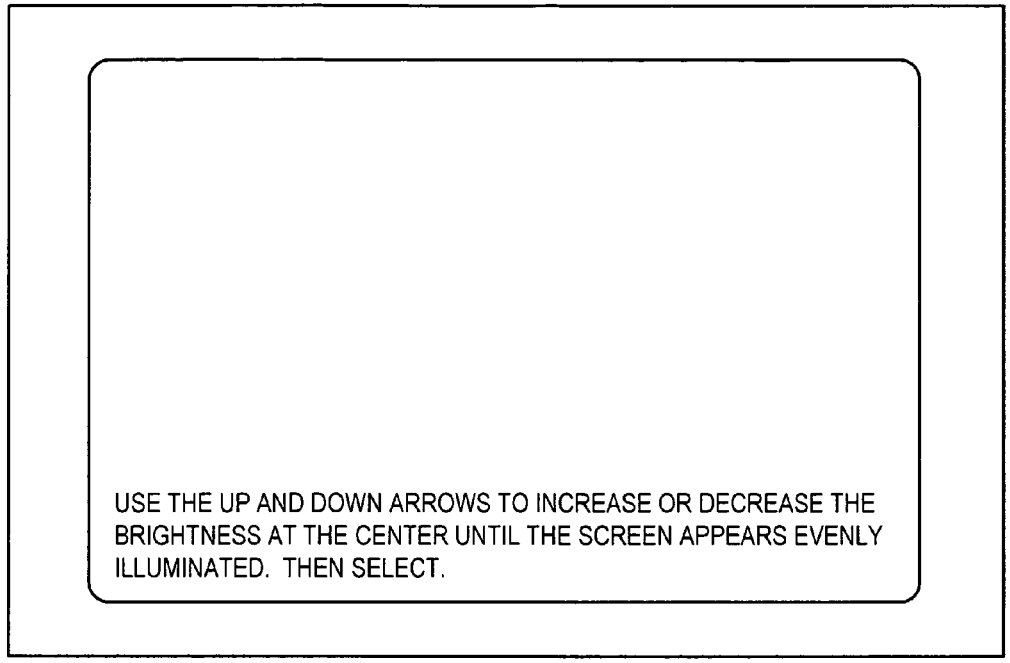
FIG. 9 is another example of a vision chart used in a manner consistent with certain embodiments of the present invention.
Figure 10:
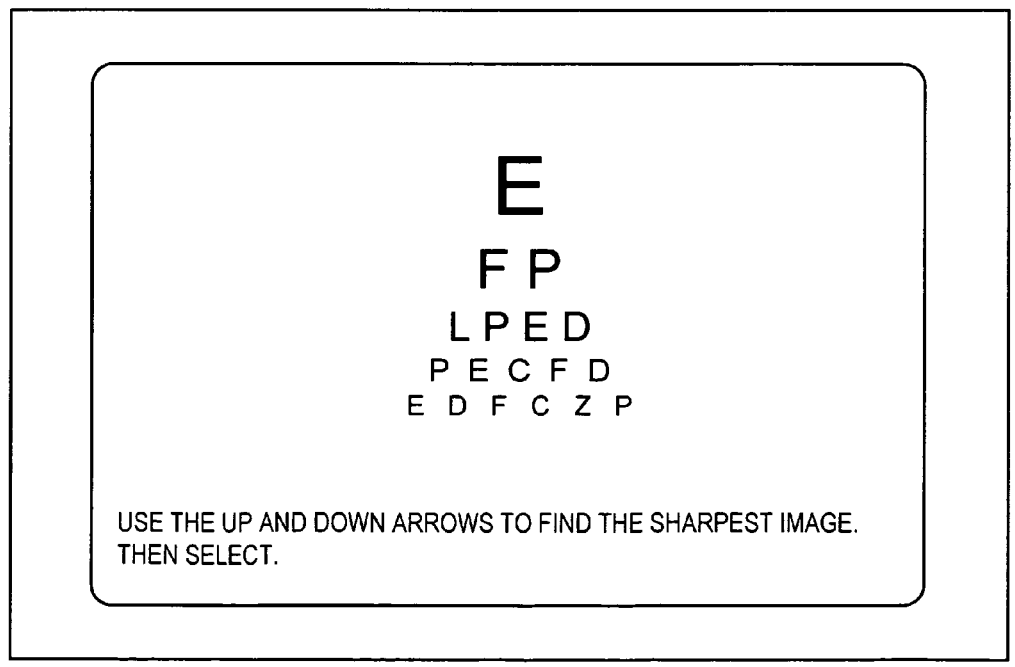
FIG. 10 is another example of a vision chart used in a manner consistent with certain embodiments of the present invention.

Similar tests can be devised such as that of FIG. 9 where the user can control the perceived brightness of a blank screen until it appears evenly illuminated. FIG. 10 depicts a conventional eye chart in which a user can adjust suitable parameters to optimize the sharpness of the viewed image or control a zoom factor to achieve a desired degree of viewability.

By way of example, if a viewer A using shutter glasses 20 has normal vision, FIG. 11 depicts that the circular image 240 appears normally as a circle 244 when viewed by the viewer A with normal vision. The same image when presented to viewer B through shutter glasses 22 as shown in FIG. 12 may be pre-warped to appear as a skewed oval 250 to compensate for a vision problem so that viewer B perceives the same circle 244. Other examples are possible and well within the scope of embodiments consistent with the present invention.

It is also noted that using a similar technique, if two tuners or two filters for tuned content are used in the television system, a similar technique can be used to display differing content for two separate users viewing the display 26 through separate sets of glasses with the synchronization of the separate content being synchronized to separate frames. For such a system, the shutter glasses should be either equipped with headphones or separate audio should be otherwise delivered to the separate users. Additionally, the present technique for separation of multiple sets of content for the multiple users, with appropriate vision correction, can utilize information in the profile database 46 to provide customized targeted advertisements to multiple users. In addition, glare can be reduced with an associated reduction in eye strain by application of a UV protective coating to the shutter glasses. This minimizes the amount of UV light from LCD backlights and other sources that reach the viewers eyes. Other variations will occur to those skilled in the art upon consideration of the present teachings.

When more than one person is using the shutter glasses, it will be helpful to provide a method to distinguish between the multiple pairs of shutter glasses. This can be used to facilitate selection of a correct user profile for the person wearing the glasses. This can be accomplished in a number of ways. In one implementation, the display can show a plurality of sequential or adjacent images such as depicted in FIG. 13. In this example, three pair of shutter glasses are in use. A user selects a menu selection for GLASSES ID from a setup menu or as a direct selection from a remote control. This implements presentation of an image (e.g., and overlay) with an identifier (e.g., A, B, C, . . . or other identifier) on the screen for identification of each of the glasses. In the example shown, the images for glasses A may appear as shown by 270 wherein the image synchronized to glasses 20 will only show the A—thereby identifying the image with the user of glasses A so that the user can correlate the current profile for glasses A to the user of glasses A. Similarly, glasses 22 will only show image 280 thereby identifying glasses 20 as glasses B which can be associated with a profile for the user of glasses B.

Once a correct set of glasses is identified, it can be either switched if incorrect or associated using a menu with a new profile as desired. The association between profile and glasses can be more or less permanent or done on a session by session basis. This process is described generally in the example 300 of FIG. 14 starting at 304 after which the TV determines if it is in a shutter glasses ID mode at 308. At 312, FOR EACH SET OF SHUTTER GLASSES, enter the identify shutter glasses mode, in which an image containing an identifier is displayed on a display of the television only during time periods of an image cycle wherein at least one shutter of the shutter glasses corresponding to the identified glasses is open. Each identifier associated with a profile has an operational parameter for an associated set of shutter glasses. The identifier can be the only thing displayed or can be displayed as an overlay over other content as shown at 316.

Thus, a television system has a display system having a display frame refresh rate R. At least one set of shutter glasses is used to view the display, where the shutter glasses are synchronized with frame refreshes to produce a left and right eye image for each of the plurality of shutter glasses, where a sequence of left and right eye images to the shutter glasses defines one image cycle. A video processor alters at least one image per image cycle so that at least one of the images to at least one eye of the shutter glasses is synchronized to a display frame that has been altered by the video processor.

In certain implementations, the image is altered to enhance vision to compensate for a vision abnormality of a viewer associated with the shutter glasses. In certain implementations, the enhancement to vision is carried out by altering display brightness or darkness. In certain implementations, the enhancement to vision is carried out by blocking an image to one eye by closing the shutter to that eye. In certain implementations, the enhancement to vision is carried out by zooming the image. In certain implementations, the enhancement to vision is carried out by rendering the image as a bent displayed image. In certain implementations, the enhancement to vision is carried out by altering the contrast of the image. In certain implementations, the enhancement to vision is carried out by altering hue, color, black level, color depth or gamma factor of the displayed image. In certain implementations, the refresh rate R is an integer multiple of approximately either 25 or 30. In certain implementations, each eye image for each of a plurality of shutter glasses is refreshed at a rate of at least approximately 25 frames per second so that one image cycle is at least approximately 50 frames per second. In certain implementations, R is greater than or equal to approximately 100 frames per second. In certain implementations, R is greater than or equal to approximately 120 frames per second. In certain implementations, each eye image for each of a plurality of shutter glasses is refreshed at a rate of at least approximately 30 frames per second so that one image cycle is at least approximately 60 frames per second.

Another television system has a display system having a display frame refresh rate R greater than or equal to approximately 100 Hz and is an integer multiple of approximately 30. A plurality of shutter glasses are used to view the display, where the shutter glasses are synchronized with frame refreshes to produce a left and right eye image for each of the plurality of shutter glasses, where a sequence of left and right eye images to each of the plurality of shutter glasses defines one image cycle, where one image cycle comprises at least approximately 30 frames per second per eye. A video processor alters at least one image per image cycle so that at least one of the images to at least one eye of at least one of the shutter glasses is synchronized to a display frame that has been altered by the video processor, where the image is altered to enhance vision to compensate for a vision abnormality of a viewer associated with one pair of shutter glasses. The enhancement to vision is carried out by at least one of: altering display brightness or darkness; blocking an image to one eye by closing the shutter to that eye; zooming the image, rendering the image as a bent displayed image; altering the contrast of the image, and altering hue, color, black level, color depth or gamma factor of the displayed image.

Another television has a display system having a display frame refresh rate R. A frame synchronizer transmitter transmits a signal used to synchronize frame refreshes for a left and right eye images of shutter glasses, where a sequence of left and right eye images to the shutter glasses defines one image cycle. A video processor alters at least one image per image cycle so that at least one of the images to at least one eye of at least one of the shutter glasses is synchronized to a display frame that has been altered by the video processor.

In certain implementations, the image is altered to enhance vision to compensate for a vision abnormality of a viewer associated with one pair of shutter glasses. In certain implementations, the enhancement to vision is carried out by at least one of: altering display brightness or darkness; blocking an image to one eye by closing the shutter to that eye; zooming the image, rendering the image as a bent displayed image; altering the contrast of the image, and altering hue, color, black level, color depth or gamma factor of the displayed image. In certain implementations, each eye image for each of a plurality of shutter glasses is refreshed at a rate of at least 30 frames per second so that one image cycle is at least 60 frames per second. In certain implementations, the refresh rate R is an integer multiple of approximately either 25 or 30. In certain implementations, each eye image for each of a plurality of shutter glasses is refreshed at a rate of at least approximately 25 frames per second so that one image cycle is at least approximately 50 frames per second. In certain implementations, R is greater than or equal to approximately 100 frames per second. In certain implementations, R is greater than or equal to approximately 120 frames per second. In certain implementations, each eye image for each of a plurality of shutter glasses is refreshed at a rate of at least approximately 30 frames per second so that one image cycle is at least approximately 60 frames per second.

Another television has a display system having a display frame refresh rate R greater than or equal to approximately 100 Hz, where each eye image for each of a plurality of shutter glasses is refreshed at a rate of at least 25 frames per second so that one image cycle is at least 50 frames per second. A frame synchronizer transmitter transmits a signal used to synchronize frame refreshes for a left and right eye images of shutter glasses, where a sequence of left and right eye images to the shutter glasses defines one image cycle. A video processor alters at least one image per image cycle so that at least one of the images to at least one eye of at least one of the shutter glasses is synchronized to a display frame that has been altered by the video processor. The image is altered to enhance vision to compensate for a vision abnormality of a viewer associated with one pair of shutter glasses and where the enhancement to vision is carried out by at least one of: altering display brightness or darkness; blocking an image to one eye by closing the shutter to that eye; zooming the image, rendering the image as a bent displayed image; altering the contrast of the image, and altering hue, color, black level, color depth or gamma factor of the displayed image.

A method of displaying television images involves displaying a sequence of frames on a display having a refresh rate R greater than or equal to approximately 100 Hz; transmitting a frame synchronizing signal used to synchronize frame refreshes for a left and right eye images of shutter glasses, where a sequence of left and right eye images to the shutter glasses defines one image cycle; and at a video processor, altering at least one image per image cycle so that at least one of the images to at least one eye of at least one of the shutter glasses is synchronized to a display frame that has been altered by the video processor.

In certain implementations, the image is altered to enhance vision to compensate for a vision abnormality of a viewer associated with one pair of shutter glasses. In certain implementations, the enhancement to vision is carried out by at least one of: altering display brightness or darkness; blocking an image to one eye by closing the shutter to that eye; zooming the image, rendering the image as a bent displayed image; altering the contrast of the image, and altering hue, color, black level, color depth or gamma factor of the displayed image. In certain implementations, the refresh rate R is an integer multiple of approximately either 25 or 30. In certain implementations, each eye image for each of a plurality of shutter glasses is refreshed at a rate of at least approximately 25 frames per second so that one image cycle is at least approximately 50 frames per second. In certain implementations, R is greater than or equal to approximately 100 frames per second. In certain implementations, R is greater than or equal to approximately 120 frames per second. In certain implementations, each eye image for each of a plurality of shutter glasses is refreshed at a rate of at least approximately 30 frames per second so that one image cycle is at least approximately 60 frames per second.

A method of identifying one of a plurality of shutter glasses associated with a television involves at the television, receiving a command to enter an operational mode for identifying shutter glasses; entering the identifying shutter glasses mode, in which an image containing an identifier is displayed on a display of the television only during time periods of an image cycle wherein at least one shutter of the shutter glasses corresponding to the identified glasses is open.

In certain implementations, in the identifying shutter glasses mode, displaying on the display of the television a second identifier only during time periods of the image cycle where at least one shutter of a second set of shutter glasses is open. In certain implementations, each identifier and thereby each set of shutter glasses is associated with a user profile stored in the television, such profile establishing at least one operational parameter for an image viewed through the corresponding shutter glasses. In certain implementations, the image is generated as an overlay image that overlays other displayed content.

Those skilled in the art will recognize, upon consideration of the above teachings, that certain of the above exemplary embodiments are based upon use of a programmed processor such as video processor 38. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television system, comprising:
a display system having a display frame refresh rate R;
at least one set of shutter glasses used to view the display, where the shutter glasses are synchronized with frame refreshes to produce a left and right eye image for each of the plurality of shutter glasses, where a sequence of left and right eye images to the shutter glasses defines one image cycle;
one or more processors configured to determine a user profile for vision correction in a manner that compensates for a vision abnormality of a view associated with shutter glasses corresponding to the user profile, where said profile establishes at least one image adjustment parameter for enhancing an image viewed through the corresponding shutter glasses;
a profile database configured to store said user profile; and
the at least one or more processors being configured to alter at least one image per image cycle so that at least one of the images to at least one eye of the shutter glasses is synchronized to a display frame that has been altered and enhanced by the one or more processors using the corresponding user profile and shutter glasses.

2. The television system according to claim 1, wherein the enhancement to vision is carried out by altering display brightness or darkness to only one of the left and right eyes.

3. The television system according to claim 1, wherein the enhancement to vision is carried out by blocking an image to one eye by closing the shutter to the one eye to prevent both the left eye image and the right eye image from reaching the one eye during each image cycle.

4. The television system according to claim 1, wherein the enhancement to vision is carried out by zooming the image.

5. The television system according to claim 1, wherein the enhancement to vision is carried out by rendering the image as a bent displayed image.

6. The television system according to claim 1, wherein the enhancement to vision is carried out by altering the contrast of the image.

7. The television system according to claim 1, wherein the enhancement to vision is carried out by altering hue, color, black level, color depth or gamma factor of the displayed image.

8. The television system according to claim 1, where the refresh rate R is an integer multiple of approximately either 25 or 30.

9. The television system according to claim 1, where each eye image for each of a plurality of shutter glasses is refreshed at a rate of at least approximately 25 frames per second so that one image cycle is at least approximately 50 frames per second.

10. The television system according to claim 1, wherein R is greater than or equal to approximately 100 frames per second.

11. The television system according to claim 1 where R is greater than or equal to approximately 120 frames per second.

12. The television system according to claim 1, where each eye image for each of a plurality of shutter glasses is refreshed at a rate of at least approximately 30 frames per second so that one image cycle is at least approximately 60 frames per second.

13. A television system, comprising:
a display system having a display frame refresh rate R greater than or equal to approximately 100Hz and is an integer multiple of approximately 30;
a plurality of shutter glasses used to view the display, where the shutter glasses are synchronized with frame refreshes to produce a left and right eye image for each of the plurality of shutter glasses, where a sequence of left and right eye images to each of the plurality of shutter glasses defines one image cycle, where one image cycle comprises at least approximately 30 frames per second per eye;
one or more processors configured to determine a user profile for vision correction in a manner that compensates for a vision abnormality of a view associated with shutter glasses corresponding to at least one user profile, where said profile establishes at least one image adjustment parameter for enhancing an image viewed through the shutter glasses corresponding to the at least one user profile;
a profile database configured to store said user profile; and
the at least one or more processors being configured to alter at least one image per image cycle so that at least one of the images to at least one eye of at least one of the shutter glasses is synchronized to a display frame that has been altered and enhanced by the one or more processors using the corresponding user profile and shutter glasses; and
wherein the enhancement to vision is carried out by at least one of: altering display brightness or darkness; blocking an image to one eye by closing the shutter to the one eye to prevent both the left eye image and the right eye image from reaching the eye during each image cycle; zooming the image, rendering the image as a bent displayed image; altering the contrast of the image, and altering hue, color, black level, color depth or gamma factor of the displayed image.

14. A television, comprising:
a display system having a display frame refresh rate R;
a frame synchronizer transmitter that transmits a signal used to synchronize frame refreshes for a left and right eye images of shutter glasses, where a sequence of left and right eye images to the shutter glasses defines one image cycle;
one or more processors configured to determine a user profile for vision correction in a manner that compensates for a vision abnormality of a view associated with shutter glasses corresponding to the user profile, where said profile establishes at least one image adjustment parameter for enhancing an image viewed through the corresponding shutter glasses;
a profile database configured to store said user profile; and
the at least one or more processors being configured to alter at least one image per image cycle so that at least one of the images to at least one eye of at least one of the shutter glasses is synchronized to a display frame that has been altered and enhanced by the one or more processors using the corresponding user profile and shutter glasses.

15. The television according to claim 14, wherein the enhancement to vision is carried out by at least one of: altering display brightness or darkness; blocking an image to one eye by closing the shutter to the one eye to prevent both the left eye image and the right eye image from reaching the one eye during each cycle; zooming the image, rendering the image as a bent displayed image; altering the contrast of the image, and altering hue, color, black level, color depth or gamma factor of the displayed image.

16. The television according to claim 14, where each eye image for each of a plurality of shutter glasses is refreshed at a rate of at least 30 frames per second so that one image cycle is at least 60 frames per second.

17. The television system according to claim 14, where the refresh rate R is an integer multiple of approximately either 25 or 30.

18. The television system according to claim 14, where each eye image for each of a plurality of shutter glasses is refreshed at a rate of at least approximately 25 frames per second so that one image cycle is at least approximately 50 frames per second.

19. The television system according to claim 14, wherein R is greater than or equal to approximately 100 frames per second.

20. The television system according to claim 14 where R is greater than or equal to approximately 120 frames per second.

21. The television system according to claim 14, where each eye image for each of a plurality of shutter glasses is refreshed at a rate of at least approximately 30 frames per second so that one image cycle is at least approximately 60 frames per second.

22. A television, comprising:
a display system having a display frame refresh rate R greater than or equal to approximately 100 Hz, where each eye image for each of a plurality of shutter glasses is refreshed at a rate of at least 25 frames per second so that one image cycle is at least 50 frames per second;
a frame synchronizer transmitter that transmits a signal used to synchronize frame refreshes for a left and right eye images of shutter glasses, where a sequence of left and right eye images to the shutter glasses defines one image cycle;
one or more processors configured to determine a user profile for vision correction in a manner that compensates for a vision abnormality of a view associated with shutter glasses corresponding to the user profile, where said profile establishes at least one image adjustment parameter for enhancing an image viewed through the corresponding shutter glasses;

a profile database configured to store said user profile; and the at least one or more processors being configured to alter at least one image per image cycle so that at least one of the images to at least one eye of at least one of the shutter glasses is synchronized to a display frame that has been altered by the one or more processors using the corresponding user profile and shutter glasses; and wherein the image is altered to enhance vision to compensate for a vision abnormality of a viewer associated with one pair of shutter glasses and where the enhancement to vision is carried out by at least one of: altering display brightness or darkness; blocking an image to one eye by closing the shutter to the one eye to prevent both the left eye image and the right eye image from reaching the one eye during each image cycle; zooming the image, rendering the image as a bent displayed image; altering the contrast of the image, and altering hue, color, black level, color depth or gamma factor of the displayed image.

23. A method of displaying television images, comprising:

displaying a sequence of frames on a display having a refresh rate R greater than or equal to approximately 100 Hz;

transmitting a frame synchronizing signal used to synchronize frame refreshes for a left and right eye images of shutter glasses, where a sequence of left and right eye images to the shutter glasses defines one image cycle;

at one or more processors, determining a user profile for vision correction in a manner that compensates for a vision abnormality of a view associated with shutter glasses corresponding to the user profile, where said profile establishes at least one image adjustment parameter for enhancing an image viewed through the corresponding shutter glasses by reference to a profile database configured to store said user profile; and at the one or more processors, altering at least one image per image cycle so that at least one of the images to at least one eye of at least one of the shutter glasses is synchronized to a display frame that has been altered and enhanced by the one or more processors using the corresponding user profile and shutter glasses.

24. The method according to claim 23, wherein the image is altered to enhance vision to compensate for a vision abnormality of a viewer associated with one pair of shutter glasses.

25. The method according to claim 24, where R is greater than or equal to approximately 120 frames per second.

26. The method according to claim 23 wherein the enhancement to vision is carried out by at least one of: altering display brightness or darkness; blocking an image to one eye by closing the shutter to the one eye to prevent both the left eye image and the right eye image from reaching the one eye during each image cycle; zooming the image, rendering the image as a bent displayed image; altering the contrast of the image, and altering hue, color, black level, color depth or gamma factor of the displayed image.

27. The method according to claim 23, where the refresh rate R is an integer multiple of approximately either 25 or 30.

28. The method according to claim 23, where each eye image for each of a plurality of shutter glasses is refreshed at a rate of at least approximately 25 frames per second so that one image cycle is at least approximately 50 frames per second.

29. The method according to claim 23, wherein R is greater than or equal to approximately 100 frames per second.

30. The method according to claim 23, where each eye image for each of a plurality of shutter glasses is refreshed at a rate of at least approximately 30 frames per second so that one image cycle is at least approximately 60 frames per second.

* * * * *